F. W. STEWART.
GLASS BLOWING APPARATUS.
APPLICATION FILED JULY 16, 1917.

1,335,533.

Patented Mar. 30, 1920.
2 SHEETS—SHEET 1.

INVENTOR
Frederick W. Stewart
By Kay Totten Powell
atty

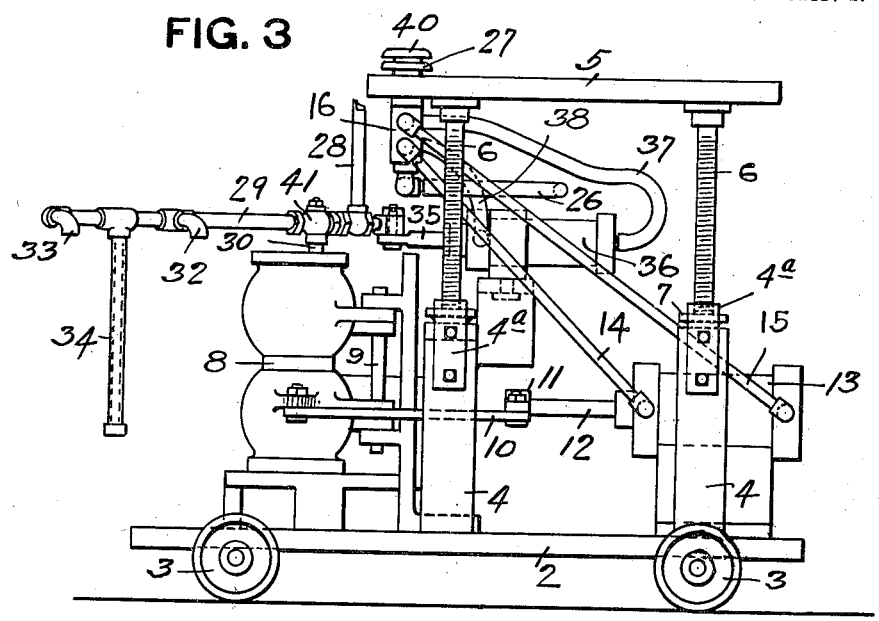
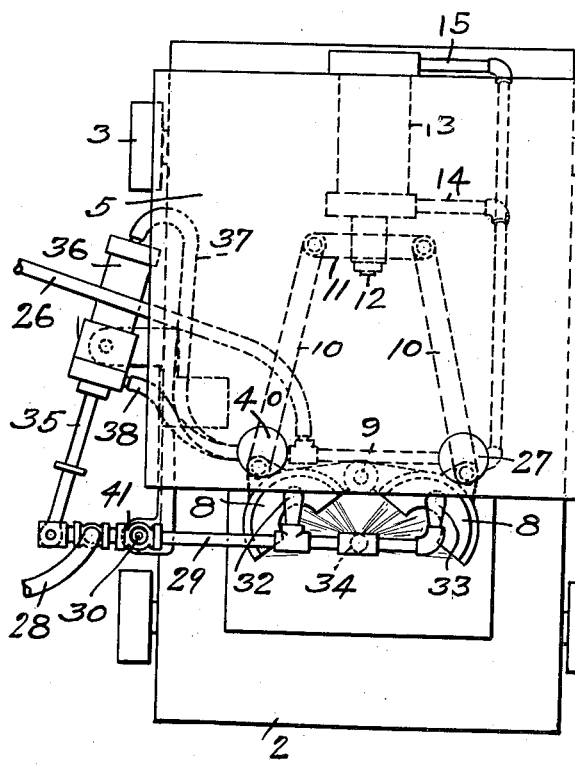
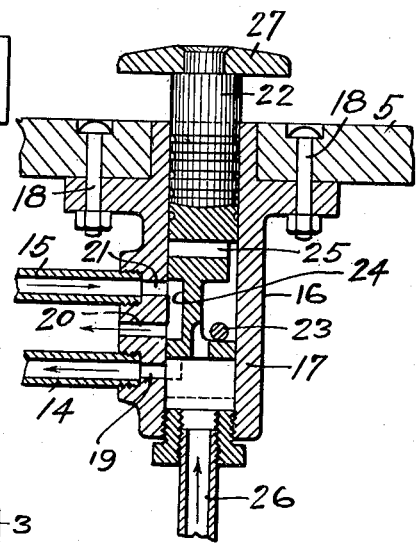

UNITED STATES PATENT OFFICE.

FREDERICK W. STEWART, OF BEAVER, PENNSYLVANIA, ASSIGNOR OF ONE-HALF TO PHOENIX GLASS COMPANY, OF PITTSBURGH, PENNSYLVANIA, A CORPORATION OF WEST VIRGINIA.

GLASS-BLOWING APPARATUS.

1,335,533.    Specification of Letters Patent.    Patented Mar. 30, 1920.

Application filed July 16, 1917. Serial No. 180,784.

*To all whom it may concern:*

Be it known that I, FREDERICK W. STEWART, a citizen of the United States, and resident of Beaver, in the county of Beaver and State of Pennsylvania, have invented a new and useful Improvement in Glass-Blowing Apparatus; and I do hereby declare the following to be a full, clear, and exact description thereof.

My invention relates to glass-blowing apparatus.

The object of my invention is to provide apparatus by means of which the blower when standing upon an elevated platform with the mold located below is able to control by means of pedals both the mechanism for opening the mold and the spraying device, whereby unaided he is able to operate both the mold-opening device and spraying device, thereby doing away with the extra boy heretofore employed for this purpose.

To these ends my invention comprises the novel features hereinafter set forth and claimed.

Figure 1:
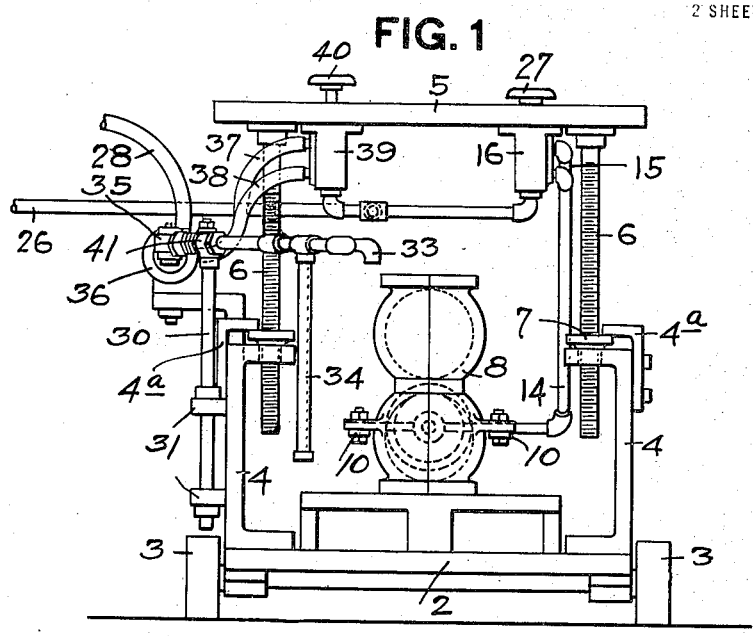
Figure 2:
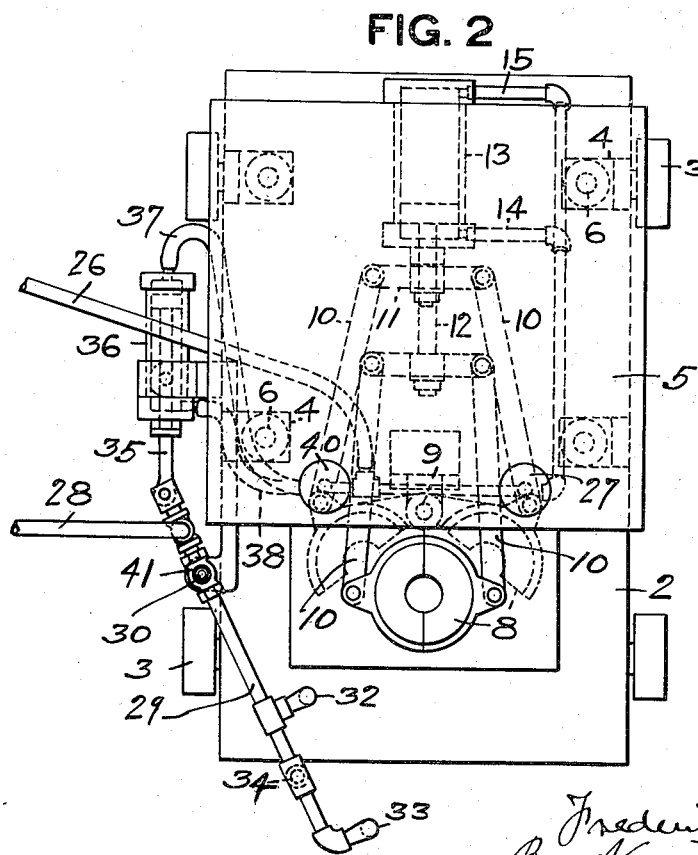

In the accompanying drawing, Figure 1 is a front view of my improved apparatus showing the mold closed; Fig. 2 is a plan view; Fig. 3 is a side elevation; Fig. 4 is a plan view showing the mold open and the spraying device in operation; and Fig. 5 is an enlarged detail of the valve.

In the drawings, the numeral 2 designates a suitable truck mounted on wheels 3, said truck carrying the brackets 4, which support the platform 5. The platform 5 has the bars 6, which have threaded engagement with the adjusting nuts 7. These nuts seat on the brackets 4, and a retainer 4ª engages the top side of the nut to hold the nut to its seat and prevent tilting of the table. In this manner the threaded bars may be quickly adjusted to any desired height according to the height to which it is desired to adjust the table.

A suitable mold 8 is mounted on the truck below the table and in such position that the blower standing upon the table can readily insert the blow-pipe in the mold and blow therein. This mold is an ordinary two-part mold mounted on the hinge-pin 9. Connected to each mold-section is a strap 10 connected to the cross-arm 11 connected to the piston-rod 12 of the cylinder 13. The gaseous fluid for operating the cylinder 13 is conveyed to the inner and outer ends of the cylinder 13 by the pipes 14 and 15, respectively, which lead from the valve 16. This valve 16 has the casing 17 which is secured to the platform by bolts 18, and said casing is provided with the ports 19, 20 and 21. The port 19 communicates with the pipe 14, and the port 21 communicates with the pipe 15, the port 20 being the exhaust. The valve-stem 22 is adapted to move up and down in the casing 17, its upward movement being controlled by the stop 23. This valve-stem has the ports 24 and 25, which register with the ports 19, 20 and 21 in different positions of the valve, as will hereinafter more fully appear. The gaseous fluid is supplied to the valve by the pipe 26.

The pedal 27 is connected to the upper end of the valve-stem for operating the valve. The pressure of the gaseous fluid entering the pipe 26 normally holds the valve in its raised position with the port 19 open so as to hold the mold open.

The spraying device consists of the flexible pipe 28 leading from the water-supply, said pipe connecting up with the pipe 29, said pipe being connected to the vertical rod 30 mounted to turn on bearings 31 on one of the brackets 4. A valve 41 is located in the pipe 29 and said valve is opened and closed by the swinging movement of said pipe. This is an ordinary form of plug-valve whose stem forms the pivot on which the pipe 29 swings. This pipe 29 carries the nozzles 32 and 33, as well as the elongated spray-pipe 34.

The outer end of the pipe 29 is connected up with the piston-rod 35 of the cylinder 36. The pipes 37 and 38 lead from opposite ends of the cylinder 36 to the valve 39 similar to the valve 16. This valve 39 is operated by the pedal 40. A gaseous fluid supply-pipe 26 also communicates with the valve 39.

When my improved apparatus is in use, the blower standing upon the platform 5 inserts the blow-pipe with the glass thereon into the mold, which is normally open. When the blower has adjusted the blow-pipe in position, he puts his foot on the pedal 27 whereupon the valve is lowered and the gaseous fluid passes to the rear end of the cylinder 13, and the straps 10 are advanced to close the mold. After the blowing operation is finished, the blower then releases his foot from the pedal 27 and the valve is raised to admit the gaseous fluid to the front end of the cylinder 13, which acts through the straps 10 to open the mold. When the article blown has been removed and with the mold still in its open position, the operator then places his foot upon the pedal 40, whereupon through the connections described gaseous fluid is admitted to the rear end of the cylinder 36 and the piston 35 is advanced, acting to move the pipe 29 around into the position indicated in Fig. 4, and by this same movement the valve 41 is opened and the liquid passes by the pipe 28 through the pipe 29 to the nozzles 32 and 33 and the elongated spray-pipe 34. The nozzles 32 and 33 discharge onto the top of the mold and cool the same while the elongated spray-pipe 34 sprays the inner walls of the mold for its entire length. When the mold has been properly sprayed, the operator lifts his foot from the pedal 40 and the spraying device is withdrawn, whereupon he again inserts the blow-pipe into the mold, closes the mold by placing his foot on the pedal 27, and the blowing operation is repeated.

By my invention I provide a very simple and convenient form of apparatus by means of which the blower controls the opening and closing of the mold as well as the spraying device, and the boy heretofore employed for opening, closing and spraying same is dispensed with.

The table is readily adjusted vertically for the convenience of the blower by simply turning the nuts 7.

What I claim is:

1. In glass-blowing apparatus, the combination of a platform, a pedal, a valve, connections between said pedal and valve, a cylinder, a piston in said cylinder, air connections leading to the opposite sides of said cylinder controlled by said valve, a mold and connections between said mold and said piston.

2. In apparatus for blowing glassware, the combination with a platform, of a pedal, a valve, connections between said pedal and said valve, a cylinder, a piston in said cylinder, air connections leading to the opposite sides of said cylinder controlled by said valve, a swinging pipe connected to said piston, and a valve in said pipe operated by the swinging of same, and a spraying device carried by said pipe.

In testimony whereof I, the said FREDERICK W. STEWART, have hereunto set my hand.

FREDERICK W. STEWART.

Witnesses:
JOHN F. WILL,
J. R. KELLER.